(No Model.)
G. W. SEYLAR.
CAR WHEEL.
No. 457,094. Patented Aug. 4, 1891.
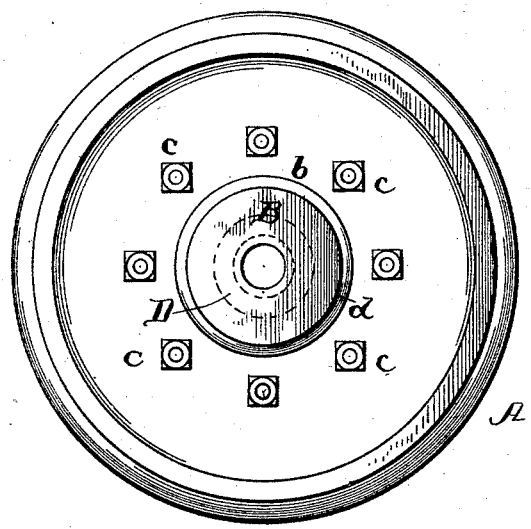
Fig. I.
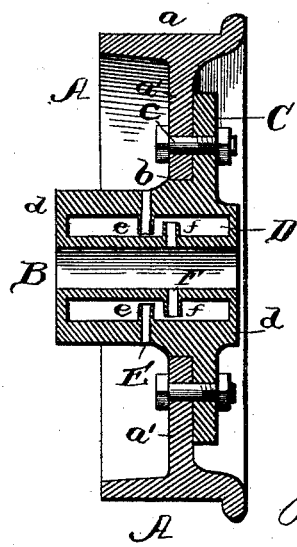
Fig. II.
Witnesses:
J. B. McGirr.
W. F. Bernhard
Inventor.
George W. Seylar
By his Attorneys
Edson Bros.

UNITED STATES PATENT OFFICE.

GEORGE W. SEYLAR, OF HANCOCK, MARYLAND.

CAR-WHEEL.

SPECIFICATION forming part of Letters Patent No. 457,094, dated August 4, 1891.

Application filed April 17, 1891. Serial No. 389,362. (No model.)

*To all whom it may concern:*

Be it known that I, GEORGE W. SEYLAR, a citizen of the United States, and a resident of Hancock, in the county of Washington and State of Maryland, have invented certain new and useful Improvements in Car-Wheels; and I do hereby declare the following to be a full, clear, and exact description of the invention, such as will enable others skilled in the art to which it appertains to make and use the same.

My invention relates to improvements in metallic wheels especially designed for use on mine or lumber cars and other places where a tight or loose wheel is used, and the objects are, first, to provide a wheel having its parts constructed especially with a view to withstand the wear and use to which they are practically applied, and, secondly, to provide means for automatically feeding lubricants to the axle, and which prevents the lubricant from escaping.

With these ends in view my invention consists of a wheel having its rim cast of hard metal and its hub cast of soft metal, said hub having a seat or shoulder against which the rim bears, the rim and hub being secured rigidly by bolts or rivets passing through the rim and the annular projection or flange integral with the seat or shoulder on the hub and extending outwardly at right angles to the hub. The interior of the hub is provided with an annular chamber closed at its ends and extending around the hub, and oil or other liquid lubricant is supplied in the chamber through openings in the outer portion of the hub, which are continued in the chamber by tubes extending almost to the inner side or shell of the oil-chamber. Feed-holes are provided in the inner shell, and they are also continued into the chamber by small tubes which extend almost to the outer shell, so that the lubricating-oil will flow into the axle continuously and not too fast and keep the wheel in easy working order.

My invention further consists of certain details of construction, as will fully appear hereinafter.

To enable others to more readily understand my invention, I have illustrated the same in the accompanying drawings, in which—

Figure I is a side elevation of a wheel made in accordance with my invention. Fig. II is a sectional view on the line $x\ x$ of Fig. I.

Referring to the drawings, in which like letters of reference refer to like parts in the several figures, A designates the rim of the wheel, which has a tread $a$ of desired shape, and is provided with an inwardly-extending body $a'$ on the inner side of the tread, said body being fitted on a seat on the hub. This rim is cast in one piece of white or hard metal, so that it need not be chilled, which is very advantageous, as it has been found that the rims invariably wear out and are damaged in use while the hubs are comparatively in good condition; but as the rims of my wheel are hard metal the wear is considerably lessened. The hub E is cast of soft metal, and is provided with a shoulder $b$, extending outwardly from the hub entirely around the same, and the inwardly-extending body $a'$ on the rim is arranged to fit tightly around this shoulder or seat $b$. On one side of the shoulder or seat $b$ is an annular flange C integral with the hub and seat, which extends outwardly beside the body $a$ when it is placed in position on the seat $b$ around the hub, and the two parts $a$ and $b$ are securely fastened or united together by bolts $c$ passing through both flanges. A firm and rigid joint is thus secured between the hub and rim, and a simple, cheap, and desirable wheel is provided. The rim is firmly seated against the shoulder on the hub, to which it is secured by the bolts or rivets through the parts, and the flange C forms a guide to prevent the rim from being displaced, as well as a means for securing the rim.

By casting the rim of hard metal and the hub of soft metal many advantages are secured, as the wheel can be more readily and cheaply constructed and will last a longer time than if made of soft metal and chilled; also, if either part becomes worn it can be readily replaced at a small expense, which is especially desirable in lumber camps and mines situated at a distance from a machine-shop, as by my construction the part that is worn or damaged need only be replaced without furnishing an entire new wheel. When tight wheels made in one piece are used, it is often necessary to send the wheel and axle to the shop to have the wheel replaced; but with a sectional wheel as contemplated by my invention a new rim can be obtained, as the hubs seldom wear out.

This improved wheel can be used when a tight or loose wheel is desired, and to facilitate the movement of a loose wheel I have provided an automatic oil-feeder which supplies oil to the axle at every revolution. Extending entirely around the hub is a chamber D, which has its ends closed, and this chamber is provided with a series of two or more inlet-openings E in the outer shell $d$ of the hub which have the tubes $e$ integral with the outer shell $d$, extending into the chamber close to the inner shell $d'$ and forming a continuation of the openings E. By this arrangement a sufficient quantity of oil is admitted into the chamber through the outside opening E, and as these tubes extend almost entirely across the chamber the oil cannot escape again through these tubes.

There are one or more feed-holes F in the inner shell of the chambered hub, arranged out of line with the tubes $e$, and these holes are also continued into the chamber by small tubes $f$, which extend almost to the outer shell and admit the oil to the axle and distribute it as the wheel revolves. By this construction the flow of oil from the chamber to the axle is regulated, and the tubes prevent the oil from feeding too fast. The peculiar arrangement of the tubes and openings out of line with each other in the outer shell render it unnecessary to provide stoppers or other closing devices on the outer shell; but any desired devices for closing these openings may be provided if it is found necessary or desirable.

I am aware that changes in the form and proportion of parts and details of construction can be made without departing from the spirit or sacrificing the advantages of my invention, and I therefore reserve the right to make such changes as fall within the scope of my invention.

Having thus fully described my invention, what I claim as new, and desire to secure by Letters Patent, is—

1. In a wheel, the hub having the concentric inner and outer shells forming the annular chamber between the same, the inlet-openings in the outer shell, the tubes extending into the chamber from said openings close to the inner shell, and the feed-openings in the inner shell having the tubes extending into the chamber close to the outer shell and forming a continuation of said feed-openings, substantially as described.

2. In a wheel, the hub having an annular chamber within the same and the openings in the outer shell of the hub, the tubes extending into the chamber from said openings and terminating near the inner shell, and the feed-tubes in the inner shell, substantially as described.

3. In a wheel, the hard-metal rim, the soft-metal hub provided with a seat, and the annular flange integral with the hub projecting beyond the seat or shoulder and adjacent thereto, and the circular oil-chamber within the hub and having a series of openings in the outer shell, the tubes within the chamber and extending near the inner shell, and the feed-tubes in the inner shell arranged out of line with the tubes, substantially as described.

In testimony whereof I affix my signature in presence of two witnesses.

GEORGE W. SEYLAR.

Witnesses:
A. T. SUTTON,
W. S. CORNELIUS.